United States Patent
Zhu et al.

(10) Patent No.: US 11,888,383 B2
(45) Date of Patent: Jan. 30, 2024

(54) CONTROL OF PASSIVE ELECTRIC SYSTEMS POWERED BY ENERGY HARVESTING

(71) Applicant: Infineon Technologies AG, Neubiberg (DE)

(72) Inventors: Qi Zhu, Munich (DE); Doris Keitel-Schulz, Hoehenkirchen (DE); Natasha Novik, Freising (DE); Helmut Sochor, Munich (DE)

(73) Assignee: Infineon Technologies AG, Neubiberg (DE)

(*) Notice: Subject to any disclaimer, the term of this patent is extended or adjusted under 35 U.S.C. 154(b) by 0 days.

(21) Appl. No.: 17/728,134

(22) Filed: Apr. 25, 2022

(65) Prior Publication Data

US 2022/0360140 A1    Nov. 10, 2022

(51) Int. Cl.
    *H02K 7/18*      (2006.01)
    *H02J 50/00*     (2016.01)
    *H02J 7/34*      (2006.01)
    *H02M 1/00*      (2006.01)

(52) U.S. Cl.
    CPC .......... *H02K 7/1853* (2013.01); *H02J 50/001* (2020.01); *H02M 1/0006* (2021.05); *H02J 7/345* (2013.01)

(58) Field of Classification Search
    CPC ..... H02J 50/001; H04B 5/00; G07C 2209/00; G07C 9/00
    See application file for complete search history.

(56) References Cited

U.S. PATENT DOCUMENTS

| | | | |
|---|---|---|---|
| 2010/0301669 A1* | 12/2010 | Lawrence | H02J 1/14 307/19 |
| 2011/0241624 A1 | 10/2011 | Park et al. | |
| 2012/0001603 A1 | 1/2012 | Ouyang et al. | |
| 2012/0108168 A1* | 5/2012 | Metivier | H02J 50/10 455/41.1 |
| 2018/0114389 A1* | 4/2018 | Geiszler | G07C 9/00309 |
| 2018/0334841 A1* | 11/2018 | Langenberg | E05F 15/611 |

OTHER PUBLICATIONS

European Search Report, EP 21 17 2757, dated Oct. 7, 2021, pp. 7.

* cited by examiner

*Primary Examiner* — Rexford N Barnie
*Assistant Examiner* — Joseph N Inge
(74) *Attorney, Agent, or Firm* — Armis IP Law, LLC

(57) ABSTRACT

A method for controlling an electric load is described herein. In accordance with one embodiment the method includes collecting ambient energy using an energy harvesting circuit and using the collected ambient energy to charge a buffer capacitor. The method further includes alternatingly connecting and disconnecting an electrical load and the buffer capacitor, wherein a capacitor voltage provided by the buffer capacitor is applied to the electrical load in a discharging phase, in which the electrical load is connected to the buffer capacitor and the capacitor voltage decreases, and wherein the buffer capacitor is recharged in a charging phase, in which the electrical load is disconnected from the buffer capacitor in a charging phase in which the capacitor voltage again increases. The durations of the charging phase and the discharging phase are designed such that the capacitor voltage stays above a minimum supply voltage of the electrical load.

28 Claims, 2 Drawing Sheets

CONTROL OF PASSIVE ELECTRIC SYSTEMS POWERED BY ENERGY HARVESTING

RELATED APPLICATION

This application claims priority to earlier filed European Patent Application Serial Number EP21172757 entitled "CONTROL OF PASSIVE ELECTRIC SYSTEMS POWERED BY ENERGY HARVESTING,", filed on May 7, 2021, the entire teachings of which are incorporated herein by this reference.

TECHNICAL FIELD

The following disclosure relates to the field of passive systems powered by energy harvesting.

BACKGROUND

Energy harvesting is a process by means of which electricity is obtained from one or more external sources such as ambient electromagnetic fields, solar energy, thermal energy, wind energy, mechanic motion (e.g. vibration), etc., which are sometimes collectively referred to as "ambient energy". In this process, energy is captured (harvested) and stored for use in so-called passive systems, i.e. systems that do not have their own power supply.

Energy harvesting circuits that convert ambient energy into electrical energy have created much interest in both the military and commercial sectors. Some systems, for example, convert motion, such as that of ocean waves, into electricity for autonomously operating oceanographic monitoring sensors. So-called "wearable electronics" which also do not have their own power supply, are another field in which energy harvesting is employed.

Energy harvesting circuits usually provide a rather small amount of power and are therefore only suitable for supplying low-power electronics. One very common application is in RFID and NFC tags (RFID=Radio-Frequency Identification, NFC=Near Field Communication), which obtain the power needed for operation from the electromagnetic field produced by an NFC-enabled device (e.g. a mobile phone). NFC is standardized in ISO/IEC 18092 (*Near Field Communication Interface and Protocol-1*) and ISO/IEC 21481 (*Near Field Communication Interface and Protocol-2*) and is therefore not discussed in greater detail herein.

As mentioned, usually only a relatively small amount of electrical power can be provided by means of energy harvesting. Therefore, known energy harvesting circuits are usually not capable of supplying sufficient energy for loads such as electromechanical actuators (e.g. electric motors), which consume significantly more power than the circuitry of, e.g., an RFID/NFC tag or the like. Collecting the required electric energy for such loads from ambient energy sources would, in many applications, consume an unreasonably large amount of time or would require huge buffer capacitors.

SUMMARY

A method for controlling an electric load is described herein. In accordance with one embodiment the method includes collecting ambient energy using an energy harvesting circuit and using the collected ambient energy to charge a buffer capacitor. The method further includes alternatingly connecting and disconnecting an electrical load and the buffer capacitor, wherein a capacitor voltage provided by the buffer capacitor is applied to the electrical load in a discharging phase, in which the electrical load is connected to the buffer capacitor and the capacitor voltage decreases, and wherein the buffer capacitor is recharged in a charging phase, in which the electrical load is disconnected from the buffer capacitor in a charging phase in which the capacitor voltage again increases. The durations of the charging phase and the discharging phase are designed such that the capacitor voltage stays above a minimum supply voltage of the electrical load.

Furthermore, an electromechanical lock is described herein. In accordance with one embodiment, the electromechanical lock includes an electric motor configured to move a latch of the lock, an energy harvesting circuit configured to collect ambient energy using a Near-Field Communication (NFC) antenna and further configured to use the collected ambient energy to charge a buffer capacitor, and a control circuit configured to alternatingly connect and disconnect the electric motor and the buffer capacitor. This is done in such a way that a capacitor voltage provided by the buffer capacitor is applied to the electric motor in a discharging phase, in which the electric motor is connected to the buffer capacitor and the capacitor voltage decreases, and that the electrical load is disconnected from the buffer capacitor in a charging phase so that the capacitor voltage again increases. The durations of the charging phase and the discharging phase are designed such that the capacitor voltage stays above a minimum supply voltage of the electric motor.

Further embodiments herein include an apparatus comprising: wireless receiver hardware operative to wirelessly receive energy and store the received energy in an energy storage device to produce a supply voltage (such as capacitor voltage); and a controller operative to: i) monitor a magnitude of the supply voltage stored in the energy storage device; and ii) during cyclical ON/OFF control of supplying power from the supply voltage to a mechanical load, prevent the magnitude of the supply voltage from falling below a threshold level.

In further example embodiments, the cyclical control includes: charging of the energy storage device via the received energy during a first portion of a respective control cycle of the cyclical control while the energy storage device is electrically disconnected from the mechanical load; and discharging of the energy storage device during a second portion of the respective control cycle of the cyclical control while the energy storage device is electrically connected to power the mechanical load.

BRIEF DESCRIPTION OF THE DRAWINGS

In the following detailed description, reference is made to the accompanying drawings. The drawings form a part of the description and illustrate examples of how the invention may be used and implemented. It is to be understood that the features of the various embodiments described herein may be combined with each other, unless specifically noted otherwise.

DETAILED DESCRIPTION

In the embodiments described herein, a passive system which operates using electric energy collected by means of energy harvesting is described, wherein the passive system includes an electrically controlled actuator such as, e.g., an electromechanical actuator (e.g. an electric motor). It should be noted that the electrically controlled actuator is merely an arbitrary example of an electric load that requires more electric power than the amount generally obtainable by means of energy harvesting. Furthermore, the energy harvesting circuit used in the embodiments described herein extracts energy from an electromagnetic field which is generated by a device, such as a mobile phone, that is enabled for near-field communication (NFC), which is a standard feature of most modern mobile telephones). It is noted that the concepts described herein may easily also be used in connection with energy harvesting circuits that collect energy from other ambient energy sources, as well, such as mechanical vibration, solar radiation, or the like.

Figure 1:
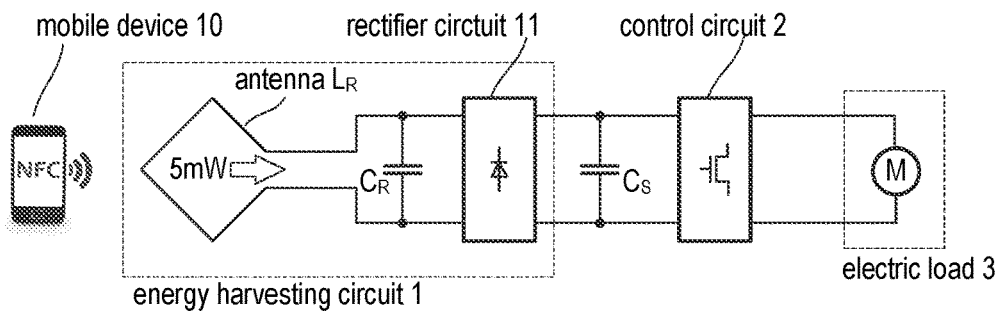
FIG. 1 illustrates one exemplary application of a passive system which includes an electromechanical actuator, such as an electric motor, powered by a buffer capacitor which itself is charged by an energy harvesting circuit.

FIG. 1 illustrates one example of the general structure of a passive system that includes an electromechanical actuator, such as an electric motor (see FIG. 1, electric load 3), that is supplied with energy by a buffer capacitor $C_S$ that is charged by an energy harvesting circuit 1. In the example of FIG. 1, the energy harvesting circuit includes an antenna $L_R$ (which has a certain inductance) coupled in parallel to a capacitor $C_R$ to form an LC parallel resonant circuit. In NFC applications the resonant circuit is designed to have a resonance frequency of approximately 13.56 MHz (which corresponds to $1/(2\pi\sqrt{L_R C_R})$). However, the resonance frequency is a design parameter that may differ in various applications. The electromagnetic field that is generated, e.g., by a device capable of wireless communication (in particular an NFC-enabled device such as a mobile phone 10) induces a voltage in the antenna $L_R$ which is rectified by a rectifier circuit 11 coupled to the resonant circuit, and the output voltage of the rectifier circuit 11 is applied to buffer capacitor $C_S$, which is charged by the energy harvesting circuit 1 when an NFC field is present.

The electric energy stored in the buffer capacitor $C_S$ equals $C_S V_S^2/2$, wherein $V_S$ denotes the capacitor voltage and $C_S$ also denotes the capacitance of the buffer capacitor. The average power that can be output by the energy harvesting circuit 1 may be rather low (in the low milliwatt range, e.g. 5 mW or less) and heavily depends on a-priori unknown parameters such as the distance between the NFC-enabled device 10, the output power of the NFC-enabled device, etc. In one example, in which the energy harvesting circuit includes a small solar cell instead of the NFC antenna, one of the aforementioned unknown parameters is the current irradiation received by the solar cell.

In the system of FIG. 1, the electric load 3 is an electric motor, wherein the mechanical output power (which equals output torque times angular velocity)—and thus the electric power consumption of the electric motor, may be significantly higher than the average power provided by the energy harvesting circuit 1. Accordingly, a continuous operation of the electric load 3 is not possible. However, a continuous operation of the load 3 is not required in many applications and the energy needed to operate the load for a certain time can be stored in the buffer capacitor $C_S$.

Figure 2:
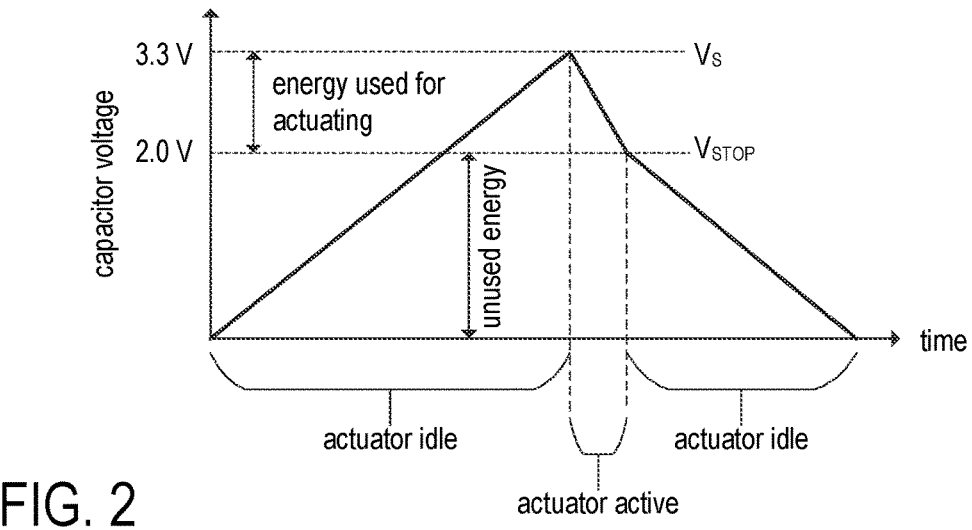
FIG. 2 illustrates an exemplary timing diagram depicting the energy that is lost when a load (e.g. actuator) is supplied with energy by the buffer capacitor.

The timing diagram in FIG. 2 illustrates an example of one operation cycle of the load 3 included in the system of FIG. 1. For the following discussion it is assumed that the load 3 requires a minimum supply voltage $V_{STOP}$ in order to be able to operate properly. In case of an electric motor, the rotor of the motor will stop as soon as the supply voltage $V_S$ falls below the value $V_{STOP}$. Such an assumption (minimum supply voltage requirement) is valid for most electric loads in practical applications. In the example of FIG. 2, the electric motor requires a minimum voltage $V_{STOP}$ of approximately 2 V, whereas the energy harvesting circuit is capable of providing an open-loop supply voltage of approximately 3.3 V that is, the buffer capacitor $C_S$ can be charged up to $V_S=3.3$ V when the motor 3 is off (first idle phase, left part of FIG. 2).

Once the motor is switched on, the capacitor voltage $V_S$ will drop, while the rotor of the motor continues to rotate and to output mechanical power. In the present example, the desired rotation of the rotor (e.g. a 180° rotation to move a mechanical latch of a lock) of the motor 3 must be completed before the capacitor voltage Vs drops below the threshold $V_{STOP}$ because the rotor of the motor will stop rotating below that voltage threshold. It can be seen from FIG. 2 that a significant portion of the energy (namely $C_S V_{STOP}^2/2$) stored in the buffer capacitor $C_S$ remains unused. For electric DC motors $V_{STOP}$ may be, for example, between 1.8 V and 2.3 V.

The size of buffer capacitor $C_S$ and the maximum capacitor voltage $V_S$ must be chosen such that the load 3 (e.g. actuator, motor) is able to generate the desired output work W. A rough estimation neglecting losses yields $W \leq C_S V_S^2/2 - C_S V_{STOP}^2/2$. The parameter $V_S$ is usually limited by the energy harvesting method used, and the parameter $V_{STOP}$ is usually given by the type of load used in the considered system. Consequently, to increase the out-put work, the buffer capacitor needs to be increased. Large capacitors, which may be in the range of a few mF in practical applications, naturally have correspondingly large dimensions, which may be unsuitable or undesired for many applications.

Figure 3:
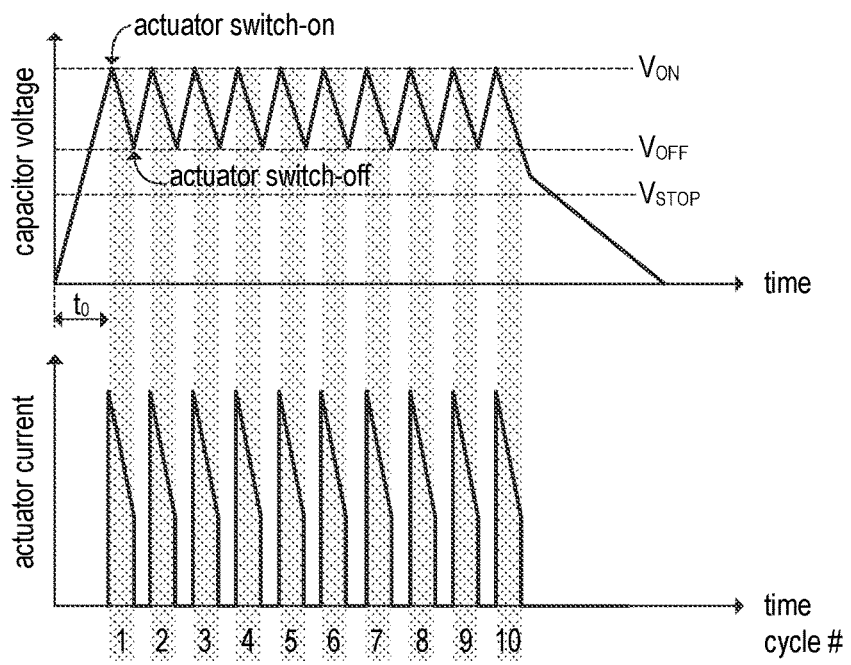
FIG. 3 illustrates, in an exemplary timing diagram, a concept for controlling the load (e.g. actuator) to efficiently use the energy stored in the buffer capacitor and provided by the energy harvesting circuit.

The timing diagrams of FIG. 3 illustrate a novel concept for controlling the load 3 (e.g. the electromechanical actuator) to efficiently use the energy stored in the buffer capacitor $C_S$ and provided by the energy harvesting circuit 1. Accordingly, the load/actuator is operated in an intermittent manner, so that the capacitor voltage $V_S$ stays in an interval between $V_{ON}$ and $V_{OFF}$ which is above the threshold voltage $V_{STOP}$ (i.e. $V_{STOP}<V_{OFF}<V_{ON}$) From a user's perspective, the actuator moves in a quasi-continuous manner because the phases, during which the actuator is switched-off to allow a recharging of the buffer capacitor $C_S$, are relatively short. In reality the actuator moves stepwise, wherein the number of steps may be freely configured. In practice the number of steps will be so high that the actuator will perform the desired movement or—in other words—will output the desired (mechanical) work W.

As illustrated in FIG. 3 (top diagram), the buffer capacitor $C_S$ is charged as soon as the ambient power source becomes active (e.g. when the mobile device 10 generates an NFC field, see FIG. 1) and the capacitor voltage $V_S$ increases until it reaches the voltage level $V_{ON}$. As soon as the capacitor voltage $V_S$ reaches the threshold $V_{ON}$ ($V_S=V_{ON}$), the load 3

(e.g. the electric motor) is switched on by the control circuit 2 (see also FIG. 1). While the load 3 is active (switched on), the capacitor voltage $V_S$ decreases, because the power consumption of the load 3 is higher than the power provided by the energy harvesting circuit 1. As a consequence, the net charge stored in the capacitor $C_S$ decreases and the capacitor voltage $V_S$ falls.

As soon as the capacitor voltage $V_S$ reaches $V_{OFF}$ ($V_S = V_{OFF}$) the load 3 is deactivated (switched off) by the control circuit 2. Once the load 3 is off, the power consumption becomes substantially zero and the capacitor $C_S$ can be charged by the energy harvesting circuit 1. Thus, the net charge stored in the buffer capacitor $C_S$ increases and the capacitor voltage $V_S$ increases accordingly during this charging phase. As soon as the capacitor voltage $V_S$ again reaches the threshold $V_{ON}$, the load 3 is again activated and the next discharging phase starts. The load current (actuator current) is illustrated in the bottom diagram of FIG. 3. While this is not necessarily the case, in the embodiments described herein, the buffer capacitor $C_S$ is continuously charged by the energy harvesting circuit 1 (provided that it is able to collect sufficient ambient energy) throughout the charging phase as well as the discharging phase. The capacitor voltage, nevertheless, decreases in the discharging phase, because the load 3 usually consumes—on average—more power than the energy harvesting circuit 1 is able to deliver, and, as a consequence, the net charge change of the charge stored in the buffer capacitor is negative during the discharging phase.

Figure 4:
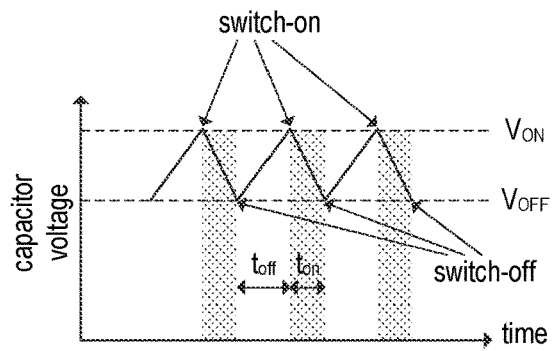
FIG. 4 illustrates a part of FIG. 3 in greater detail.

The timing diagram of FIG. 4 shows a part of the top diagram of FIG. 3 in greater detail. In the example of FIG. 4, the duration of the charging phase (in which the load 3 is off) is denoted as time $t_{off}$. Similarly, the duration of the discharging phase (in which the load 3 is on) is denoted as time $t_{on}$. As mentioned above, switching on and off the load 3 (e.g. the electric motor) may be triggered by the capacitor voltage $V_S$ reaching the threshold values $V_{ON}$ and $V_{OFF}$, respectively. However, it is noted that, for example, the discharging phase, in which the load 3 is on, may also be set to a fixed time interval $t_{on}$. In this case, the load is not deactivated when the capacitor voltage $V_S$ has fallen to the threshold $V_{OFF}$ but rather when a pre-determined time interval (with a length of $t_{on}$) has elapsed since the activation of the load. As the current consumption of the load is usually (approximately) known, the time interval $t_{on}$ can be set such that the capacitor voltage $V_S$ reliably remains above the minimum voltage $V_{STOP}$.

With the concept discussed above it is possible to decouple the desired work output of the load 3 (e.g. the desired angular displacement performed by the electric motor) from the size of the buffer capacitor $C_S$. Thus, the capacitor size can be significantly reduced, as well as the space required by the buffer capacitor and its associated costs. A smaller buffer capacitor will also reduce the initial charging time (see FIG. 3, time $t_0$), which may increase user satisfaction (as the user needs to wait less time before the actuator starts to move). Furthermore, the unused energy $C_S \cdot V_{STOP}^2 / 2$ (discussed above) is reduced when the buffer capacitor is reduced to lower capacitances. The efficiency of the overall system can thus be improved.

Figure 5:
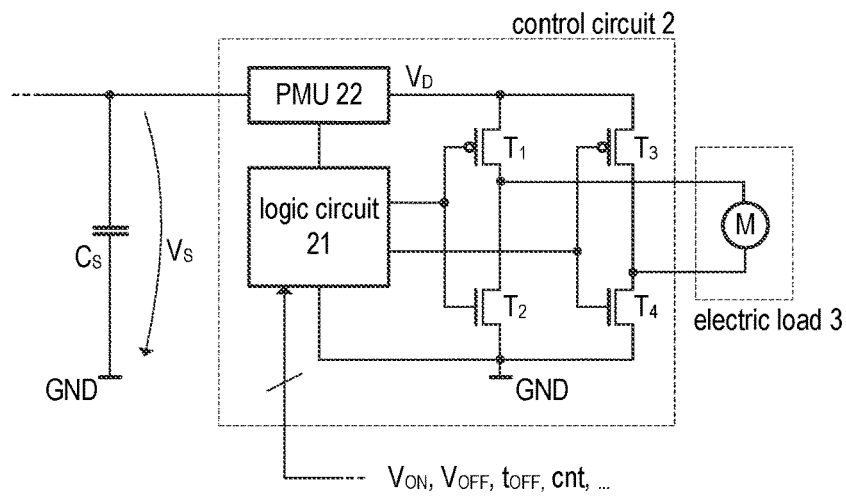
FIG. 5 illustrates one exemplary implementation of the control circuit used in the embodiment of FIG. 1.

FIG. 5 illustrates an exemplary implementation of the control circuit 2 used to control the switching operation illustrated in FIGS. 3 and 4. In the present example, a transistor H-bridge is used to drive the load 3 (electric motor), wherein the transistor H-bridge is composed of the p-channel MOS transistors $T_1$ and $T_3$ and the n-channel MOS transistors $T_2$ and $T_4$, wherein transistors $T_1$ and $T_2$ form a first half-bridge and transistors $T_3$ and $T_4$ form a second half-bridge and the load 3 is connected between the middle-taps of the half-bridges. Driving an electric load (and particularly a DC motor) with a transistor H-bridge is as such known and thus not further discussed herein. A control logic 21 is configured to generate the gate signals for the transistors $T_1$, $T_2$, $T_3$, and $T_4$ based on the current level of the capacitor voltage $V_S$ provided by the buffer capacitor $C_S$ and further based on predetermined parameters such as, for example, voltage thresholds $V_{ON}$ and/or $V_{OFF}$, the maximum number cnt of switching cycles, the times $t_{on}$ and/or $t_{off}$, the direction of the actuator movement, etc. The control circuit 2 may include a power management unit (PMU) 22 which may be coupled between the buffer capacitor $C_S$ and the other components of the control circuit 2. The PMU 22 is configured to provide a defined (e.g. regulated/stabilized) supply voltage $V_D$ to the logic circuit 21 and the, optionally, also to the transistor H-bridge. Various concepts for generating a supply voltage $V_D$ from an (unregulated) input voltage $V_S$ are as such known and thus not discussed herein in more detail. The PMU 22 may also be configured to split the input power received from the buffer capacitor $C_S$ and distribute it between the control logic 22 and the load 3.

Figure 6:
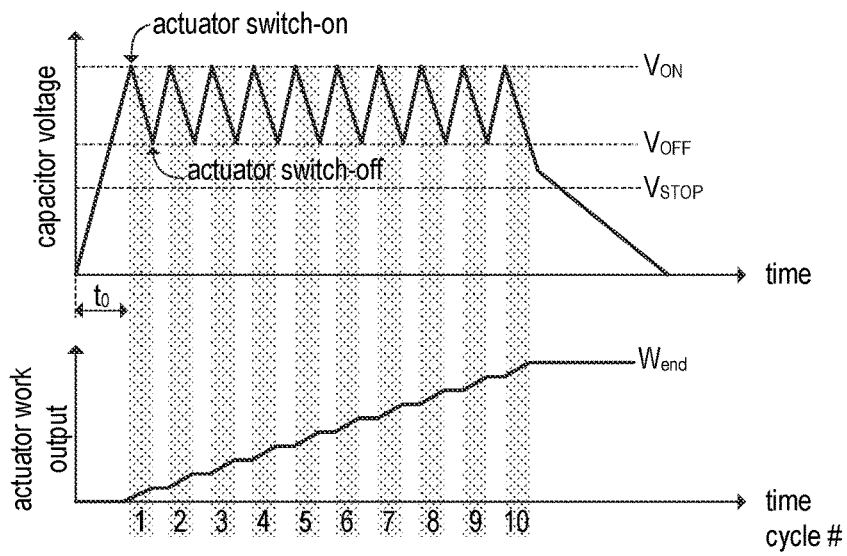
FIG. 6 illustrates, in an exemplary timing diagram, the stepwise work output of the load/actuator.

The embodiments described herein and applications thereof are summarized below. It is understood that the following is not an exhaustive discussion of technical features of the embodiments but rather a summary of some aspects. One embodiment relates to a method for controlling an electrical load of a passive system. Accordingly, the method includes collecting ambient energy using an energy harvesting circuit and using the collected ambient energy to charge a buffer capacitor (see FIG. 1, energy harvesting circuit 1 and capacitor $C_S$). In one embodiment, ambient energy as discussed herein is or includes wireless energy available and/or received by the antenna Lr. The method further includes alternatingly connecting and disconnecting the electrical load and the buffer capacitor such that the capacitor voltage $V_S$ provided by the buffer capacitor is applied to the electrical load during a discharging phase, in which the load is connected to the buffer capacitor (and the capacitor voltage $V_S$ decreases), and that the buffer capacitor is recharged during a charging phase, in which the electrical load is disconnected from the buffer capacitor. The durations of the charging phase and the discharging phase are designed such that the capacitor voltage $V_S$ stays above a minimum supply voltage $V_{STOP}$ required by the electrical load. This alternating/intermittent operation is also visualized by the diagrams of FIG. 6, where-in the top diagram of FIG. 6 is the same as in FIG. 3 and the bottom diagram of FIG. 6 illustrates the work output of the load (e.g. angular displacement times output torque in case the load being an electric motor). As shown in FIG. 6, the work output increases in each discharging phase in which the load is active, whereas the work output does not increase (e.g., decreases) during the charging phases as the load is inactive to let the capacitor recharge.

As mentioned, the electrical load may be, in one example, an electromechanical actuator such as an electric motor (e.g. a DC motor). Many energy harvesting concepts are known. In one specific example, the ambient energy is or includes the energy of an electromagnetic field generated by an NFC-enabled device (see FIG. 1, mobile phone 10). Energy can be collected by the energy harvesting circuit once the NFC-enabled device is active in the proximity of the NFC antenna included in the energy harvesting circuit.

In one example, the durations of the charging and discharging phases are determined by voltage thresholds (see FIG. 3 and FIG. 4, threshold levels $V_{ON}$, $V_{OFF}$). Accordingly, alternatingly connecting and disconnecting the electrical load and the buffer capacitor is achieved by connecting the electrical load to the buffer capacitor (in order to apply the capacitor voltage to the electrical load), when the capacitor voltage $V_S$ reaches an upper threshold voltage level (see FIG. 4, $V_{ON}$), and disconnecting the electrical load from the buffer capacitor when the capacitor voltage $V_S$ falls to a lower threshold voltage level (see FIG. 4, $V_{OFF}$). In an alternative embodiment, the duration of the discharging phase is a pre-determined time (see FIG. 4, $t_{on}$). Setting the charging phase duration to a predetermined time $t_{off}$ would also be possible. The voltage threshold levels $V_{ON}$, $V_{OFF}$ and the durations $t_{on}$, $t_{off}$ of charging and discharging phases are set such that the capacitor voltage $V_S$ does not fall to or below the minimum supply voltage $V_{STOP}$ of the load. It is understood that the parameters $V_{ON}$, $V_{OFF}$, $t_{on}$, and $t_{off}$ cannot be set independently from each other.

As illustrated in FIG. 6, alternatingly connecting and disconnecting the electrical load and the buffer capacitor may be performed until the end of the $n^{th}$ discharging phase (wherein n is a predetermined integer number greater than one, n>1) or, alternatively, until the work output of the electrical load reaches a desired target level (see FIG. 6, $W_{end}$).

One example embodiment relates to a method for controlling an electromechanical lock. Accordingly, an electric motor or another electromechanical actuator is mechanically coupled to a latch of the lock and the method described above is used to charge the buffer capacitor and drive the electric motor to move the latch. Assuming that moving the latch requires a specific (constant) output torque of the electric motor, the steps in the bottom diagram of FIG. 6 may also be interpreted as angular displacement. As mentioned, the energy harvesting circuit may collect energy from an NFC field generated by an NFC-enabled device. In this example, the switching process (i.e. the alternatingly connecting and disconnecting load and buffer capacitor) may be initiated by receiving a respective command from the NFC-enabled device using Near-Field Communication. For this purpose, the logic circuit 21 (see FIG. 5) may be configured to communicate with the NFC-enabled device using as such known Near-Field Communication techniques.

Another embodiment relates to a passive system including an electric load (e.g. an electromechanical actuator), and an energy harvesting circuit that is configured to collect ambient energy and to use the collected ambient energy to charge a buffer capacitor (see FIGS. 1 and 5). The system further includes a control circuit configured to alternatingly connect and disconnect an electrical load and the buffer capacitor such that a capacitor voltage provided by the buffer capacitor is applied to the electrical load in a discharging phase (in which the electrical load is connected to the buffer capacitor and the capacitor voltage decreases) and that the buffer capacitor is recharged in a charging phase, in which the electrical load is disconnected from the buffer capacitor. The durations of the charging phase and the discharging phase are designed such that the capacitor voltage stays above a minimum supply voltage of the electrical load (see FIG. 3, minimum supply voltage $V_{STOP}$)

In one example the control circuit control circuit includes a transistor H-bridge. However, a single transistor or any other type of electronic switch may be sufficient, depending on the actual application. The control circuit may include a logic circuit (including driver circuitry) configured to generate the control signals for the transistor(s) used to connect and disconnect load and buffer capacitor. As mentioned, the control logic may also be capable of communicating with an NFC-enabled device using Near Field Communication.

Although the invention has been illustrated and described with respect to one or more implementations, alterations and/or modifications may be made to the illustrated examples without departing from the spirit and scope of the appended claims. In particular regard to the various functions performed by the above described components or structures (units, assemblies, devices, circuits, systems, etc.), the terms (including a reference to a "means") used to describe such components are intended to correspond—unless otherwise indicated—to any component or structure, which performs the specified function of the described component (e.g., that is functionally equivalent), even though not structurally equivalent to the disclosed structure, which performs the function in the herein illustrated exemplary implementations of the invention.

The invention claimed is:

1. A system comprising:
   an energy harvesting circuit operative to collect ambient energy and use the collected ambient energy to charge a buffer capacitor;
   a control circuit operative to, via cyclical ON/OFF control, alternatingly: i) connect an electric motor to the buffer capacitor for moving a latch of an electromechanical lock during a discharging phase, and ii) disconnect the electric motor from the buffer capacitor in a charging phase;
   the alternate connecting and disconnecting of the electric motor occurring until a work output of the electric motor reaches a desired target level, or until an end of an nth discharging phase, n being a predetermined number;
   wherein durations of the charging phase and the discharging phase are controlled such that a capacitor voltage of the buffer capacitor stays above a minimum supply voltage required to operate the electric motor to move the latch;
   wherein the cyclical ON/OFF control includes implementation of multiple ON/OFF control cycles;
   wherein the control circuit, for each respective ON/OFF control cycle of the multiple cyclical ON/OFF control cycles, is operative to: i) for an ON portion of the respective ON/OFF control cycle, activate switch circuitry to an ON-state to convey the capacitor voltage to the electric motor, and ii) for an OFF portion of the respective ON/OFF control cycle, deactivate the switch circuitry to an OFF-state to prevent conveyance of the capacitor voltage to the electric motor;
   wherein the magnitude of the capacitor voltage stored in the capacitor is controlled to be greater than the minimum supply voltage during the ON portion of the respective ON/OFF control cycle; and
   wherein the magnitude of the capacitor voltage stored in the capacitor is greater than the minimum supply voltage during the OFF portion of the respective ON/OFF control cycle.

2. The system of claim 1, wherein, in the discharging phase, the capacitor voltage, which is provided by the buffer capacitor, decreases while being applied to the electric motor to supply power to the electric motor; and
   wherein, in the charging phase, the capacitor voltage increases.

3. The system of claim 1, further comprising:
   a mobile device enabled to support Near-Field Communication, including generation of an electromagnetic field; and wherein the energy harvesting circuit includes an NFC-antenna.

4. The system of claim 1, wherein the control circuit includes a transistor H-bridge.

5. The system of claim 1, wherein, to alternatingly connect the electric motor to and disconnect the electric motor from the buffer capacitor, the control circuit is operative to: i) connect the electrical motor to the buffer capacitor when the capacitor voltage reaches an upper threshold voltage level, and ii) disconnect the electrical motor from the buffer capacitor, when the capacitor voltage falls to a lower threshold voltage level.

6. The system of claim 1, wherein, to alternatingly connect and disconnect the electrical motor and the buffer capacitor, the control circuit is operative to i) connect the electrical motor to the buffer capacitor when the capacitor voltage reaches an upper threshold voltage level, and ii) disconnect the electrical motor from the buffer capacitor after a predetermined time.

7. The system of claim 1, wherein the electric motor has an electric power consumption that is higher than an average power provided by the energy harvesting circuit.

8. The system of claim 1, wherein the minimum supply voltage is a magnitude of the supply voltage required by the electric motor in order to rotate and move the latch.

9. A method for operating an electromechanical lock, the method comprising:
  collecting ambient energy using an energy harvesting circuit and using the collected ambient energy to charge a buffer capacitor with a capacitor voltage;
  via cyclical ON/OFF control, alternatingly connecting an electric motor to the buffer capacitor in a discharging phase and disconnecting the electric motor from the buffer capacitor in a charging phase;
  wherein alternatingly connecting and disconnecting the electric motor and the buffer capacitor is performed until a work output of the electric motor reaches a desired target level or until an end of an nth discharging phase, n being a predetermined number; and
  wherein durations of the charging phase and the discharging phase are controlled such that the capacitor voltage stays above a minimum supply voltage of the electric motor such that the electric motor moves a latch of the electromechanical lock;
  wherein the cyclical ON/OFF control includes implementation of multiple ON/OFF control cycles, each respective ON/OFF control cycle of the cyclical ON/OFF control cycles including: i) for an ON portion of the respective ON/OFF control cycle, activating switch circuitry to an ON-state to convey the capacitor voltage to the electric motor, and ii) for an OFF portion of the respective ON/OFF control cycle, deactivating the switch circuitry to an OFF-state to prevent conveyance of the capacitor voltage to the electric motor;
  wherein the magnitude of the capacitor voltage stored in the capacitor is controlled to be greater than the minimum supply voltage during the ON portion of the respective ON/OFF control cycle; and
  wherein the magnitude of the capacitor voltage stored in the capacitor is greater than the minimum supply voltage during the OFF portion of the respective ON/OFF control cycle.

10. The method of claim 9, wherein, in the discharging phase, the capacitor voltage, which is provided by the buffer capacitor, decreases while being applied to the electric motor; and, wherein, in the charging phase, the capacitor voltage again increases.

11. The method of claim 9, wherein the ambient energy is energy of an electromagnetic field generated by a communication device supporting wireless communication.

12. The method of claim 9, wherein the ambient energy is an energy of an electromagnetic field generated by a Near Field Communication enabled device.

13. The method of claim 9, wherein alternatingly connecting and disconnecting the electric motor and the buffer capacitor comprises:
  connecting the electric motor to the buffer capacitor to apply the capacitor voltage to the electric motor when the capacitor voltage reaches an upper threshold voltage level, and
  disconnecting the electric motor from the buffer capacitor when the capacitor voltage falls to a lower threshold voltage level.

14. The method of claim 9, wherein alternatingly connecting and disconnecting the electric motor and the buffer capacitor comprises:
  connecting the electric motor to the buffer capacitor to apply the capacitor voltage to the electric motor when the capacitor voltage reaches an upper threshold voltage level,
  wherein a duration of the discharging phase is a predetermined time.

15. The method of claim 9, wherein the electric motor has an electric power consumption that is higher than an average power provided by the energy harvesting circuit to the buffer capacitor.

16. The method of claim 9, wherein the minimum supply voltage is the supply voltage required by the electric motor in order to rotate and move the latch.

17. An apparatus comprising:
  wireless receiver hardware operative to wirelessly receive energy and store the received energy in an energy storage device to produce a supply voltage; and
  a controller operative to:
    i) monitor a magnitude of the supply voltage stored in the energy storage device; and
    ii) during cyclical ON/OFF control of supplying power from the supply voltage to a mechanical load, prevent the magnitude of the supply voltage from falling below a voltage threshold level, the magnitude of the supply voltage applied to the mechanical load above the voltage threshold level causing physical movement of the mechanical load;
  wherein the voltage threshold level is a first voltage threshold level;
  wherein the energy storage device is a capacitor;
  wherein the cyclical ON/OFF control includes implementation of multiple ON/OFF control cycles;
  wherein the controller, for each respective ON/OFF control cycle of the multiple cyclical ON/OFF control cycles, is operative to:
    i) for an ON portion of the respective ON/OFF control cycle, activate switch circuitry to an ON-state to convey the supply voltage to the mechanical load; and
    ii) for an OFF portion of the respective ON/OFF control cycle, deactivate the switch circuitry to an OFF-state to prevent conveyance of the supply voltage to the mechanical load;
  wherein the magnitude of the supply voltage stored in the capacitor is controlled to be greater than the first voltage threshold level during the ON portion of the respective ON/OFF control cycle; and wherein the magnitude of the supply voltage stored in the capacitor is greater than the first voltage threshold level during the OFF portion of the respective ON/OFF control cycle.

18. The apparatus as in claim 17, wherein the cyclical ON/OFF control includes:

charging of the energy storage device via the received energy during a first portion of a respective control cycle of the cyclical ON/OFF control while the energy storage device is electrically disconnected from the mechanical load; and discharging of the energy storage device during a second portion of the respective control cycle of the cyclical ON/OFF control while the energy storage device is electrically connected to power the mechanical load.

19. The apparatus as in claim 17, wherein the physical movement of the mechanical load ceases during a condition in which the magnitude of the supply voltage is below the voltage threshold level.

20. The apparatus as in claim 17, wherein the mechanical load requires the supply voltage to be above the voltage threshold level to cause the physical movement of the mechanical load.

21. The apparatus as in claim 17, wherein the magnitude of the supply voltage stored in the capacitor decreases during the ON portion of the respective ON/OFF control cycle; and wherein the magnitude of the supply voltage stored in the capacitor increases during the OFF portion of the respective ON/OFF control cycle.

22. The apparatus as in claim 17, wherein the cyclical ON/OFF control of supplying power from the supply voltage to the mechanical load over multiple cycles increases a work output of the mechanical load to a desired target level.

23. The apparatus as in claim 17, wherein the cyclical ON/OFF control of supplying power from the supply voltage to the mechanical load over multiple cycles results in a stepwise work output of the mechanical load.

24. The apparatus as in claim 23, wherein the stepwise work output results in angular displacement by the mechanical load.

25. The apparatus as in claim 23, wherein the work output of the mechanical load: i) increases in each of multiple discharge phases in which the supply voltage is applied to the mechanical load, and ii) does not increase in each of multiple discharge phases in which the supply voltage is not applied to the mechanical load.

26. The apparatus as in claim 17, wherein the wireless receiver hardware is operative to receive a wireless command indicating to control the mechanical load; and wherein the controller is operative to implement the wireless command.

27. The apparatus as in claim 17, wherein the cyclical ON/OFF control of supplying power from the supply voltage to the mechanical load results in charging and discharging of the energy storage device.

28. The apparatus as in claim 17, wherein the cyclical ON/OFF control of supplying power from the supply voltage to the mechanical load results in intermittent motion of the mechanical load.

* * * * *